United States Patent
Stuart

(10) Patent No.: US 6,308,970 B1
(45) Date of Patent: Oct. 30, 2001

(54) APPARATUS FOR COUPLING A BALL JOINT TO A MOTOR VEHICLE SUSPENSION

(75) Inventor: Luke J Stuart, Ann Arbor, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/468,511

(22) Filed: Dec. 21, 1999

(51) Int. Cl.$^7$ .................................................. B60G 7/02
(52) U.S. Cl. ............................. 280/86.756; 280/93.511; 280/124.134
(58) Field of Search .................. 280/86.756, 93.51, 280/93.511, 93.512, 124.134, 124.135, 124.136, FOR 124, FOR 125

(56) References Cited

U.S. PATENT DOCUMENTS

| | | | |
|---|---|---|---|
| 3,273,909 | * | 9/1966 | Muller et al. ............... 280/86.756 |
| 3,526,413 | * | 9/1970 | Muller ........................ 280/86.756 |
| 3,549,167 | * | 12/1970 | Haverbeck ................ 280/124.134 |
| 3,797,852 | | 3/1974 | Patterson et al. ................ 280/124 A |
| 3,857,149 | | 12/1974 | Hassan ........................ 29/149.5 B |
| 4,033,605 | | 7/1977 | Smith et al. .................... 280/664 |
| 4,577,534 | | 3/1986 | Rayne ............................ 81/484 |
| 4,674,760 | | 6/1987 | Goulart ........................... 280/88 |
| 4,761,019 | | 8/1988 | Dubensky ....................... 280/674 |
| 4,973,075 | | 11/1990 | Rori et al. ........................ 280/661 |
| 4,989,894 | | 2/1991 | Winsor et al. ................... 280/690 |
| 5,286,052 | | 2/1994 | Lukianov ......................... 280/675 |
| 5,655,848 | | 8/1997 | Catron ............................. 403/137 |
| 5,662,348 | * | 9/1997 | Kusama et al. ............... 280/124.134 |
| 5,662,349 | * | 9/1997 | Hasshi et al. ................. 280/124.134 |
| 5,782,484 | | 7/1998 | Kuhn, Jr. ......................... 280/663 |
| 5,879,026 | | 3/1999 | Dostert et al. ................... 280/781 |
| 5,931,485 | * | 8/1999 | Modinger et al. ............. 280/93.512 |
| 6,109,621 | * | 8/2000 | Hettich et al. .................. 280/93.51 |

FOREIGN PATENT DOCUMENTS

| | | | |
|---|---|---|---|
| 1102577 | * | 3/1961 | (DE) . |
| 5-112111 | * | 5/1993 | (JP) . |

\* cited by examiner

*Primary Examiner*—J. J. Swann
*Assistant Examiner*—Christopher Bottorff
(74) *Attorney, Agent, or Firm*—Mark P Calcaterra

(57) ABSTRACT

An apparatus for coupling a ball to a frame of a motor vehicle. The apparatus includes a main body portion and a ball joint housing. The main body portion is adapted to be pivotally mounted to the frame and has at least one support surface. The ball joint housing is coupled to the ball joint and has at least one contact surface. At least one fastener couples the main body portion and the ball joint housing in a coupled relationship such that the at least one support surface of the main body portion is in contact with the at least one contact surface of the ball joint housing.

3 Claims, 5 Drawing Sheets

APPARATUS FOR COUPLING A BALL JOINT TO A MOTOR VEHICLE SUSPENSION

BACKGROUND OF THE INVENTION

1. Technical Field

The present invention generally pertains to motor vehicles. More particular, the present invention pertains to a motor vehicle suspension system. More specifically, but without restriction to the particular embodiment and/or use which is shown and described for purposes of illustration, the present invention relates to an apparatus for coupling a ball joint to a motor vehicle suspension.

2. Discussion

Vehicle suspension systems for wheels connect an axle shaft and a vehicle body to each other and absorb vibrations and impacts from a road surface during vehicle operation to improve both vehicle safety and riding comfort. A vehicle suspension system should be flexibly connected vertically to absorb impacts.

Also, the vehicle suspension should be firmly horizontally connected to insure driving force, braking force, and centrifugal force during vehicle turning. These forces are generated at the wheel.

Independent suspension systems are mainly applied to axles of passenger cars or sport utility vehicles to improve the ride comfort and running safety by bisecting an axle and allowing both wheels to act independently of one another. There are many different types of independent suspension systems. For example, McPherson type and Wishbone type suspension systems are applied to steerable wheels and non-steerable wheels. A vehicle suspension system is designed to control position of a wheel with respect to the vehicle body to obtain a better positioning in vehicle operation, as well as to absorb vibrations or impacts. The axle is thus prevented from directly transmitting impact or vibration from the road surface to the vehicle body. Thus, optimal handling safety and running safety may be obtained. Therefore, it is desirable to have an independent suspension which provides these characteristics.

SUMMARY OF THE INVENTION

It is a general object of the present invention to provide a suspension control arm for supporting the vertical loads of a motor vehicle.

It is another object of the present invention to provide a suspension control arm for a motor vehicle having reduced weight and costs.

It is another object of the present invention to provide a suspension control arm for a motor vehicle which eliminates welds where cracks initiate, thereby improving fatigue life.

In one form, the present invention provides an apparatus for coupling a ball joint to a frame of a motor vehicle. The apparatus includes a main body portion and a ball joint housing. The main body portion is adapted to be pivotally mounted to the frame and has at least one support surface. The ball joint housing is coupled to the ball joint and has at least one contact surface. At least one fastener couples the main body portion and the ball joint housing in a coupled relationship such that the at least one support surface of the main body portion is in contact with the at least one contact surface of the ball joint housing.

Additional benefits and advantages of the present invention will become apparent to those skilled in the art to which this invention relates from a reading of the subsequent description of the preferred embodiment and the appended claims, taken in conjunction with the accompanying drawings.

DETAILED DESCRIPTION OF THE PREFERRED EMBODIMENT

Figure 1A:
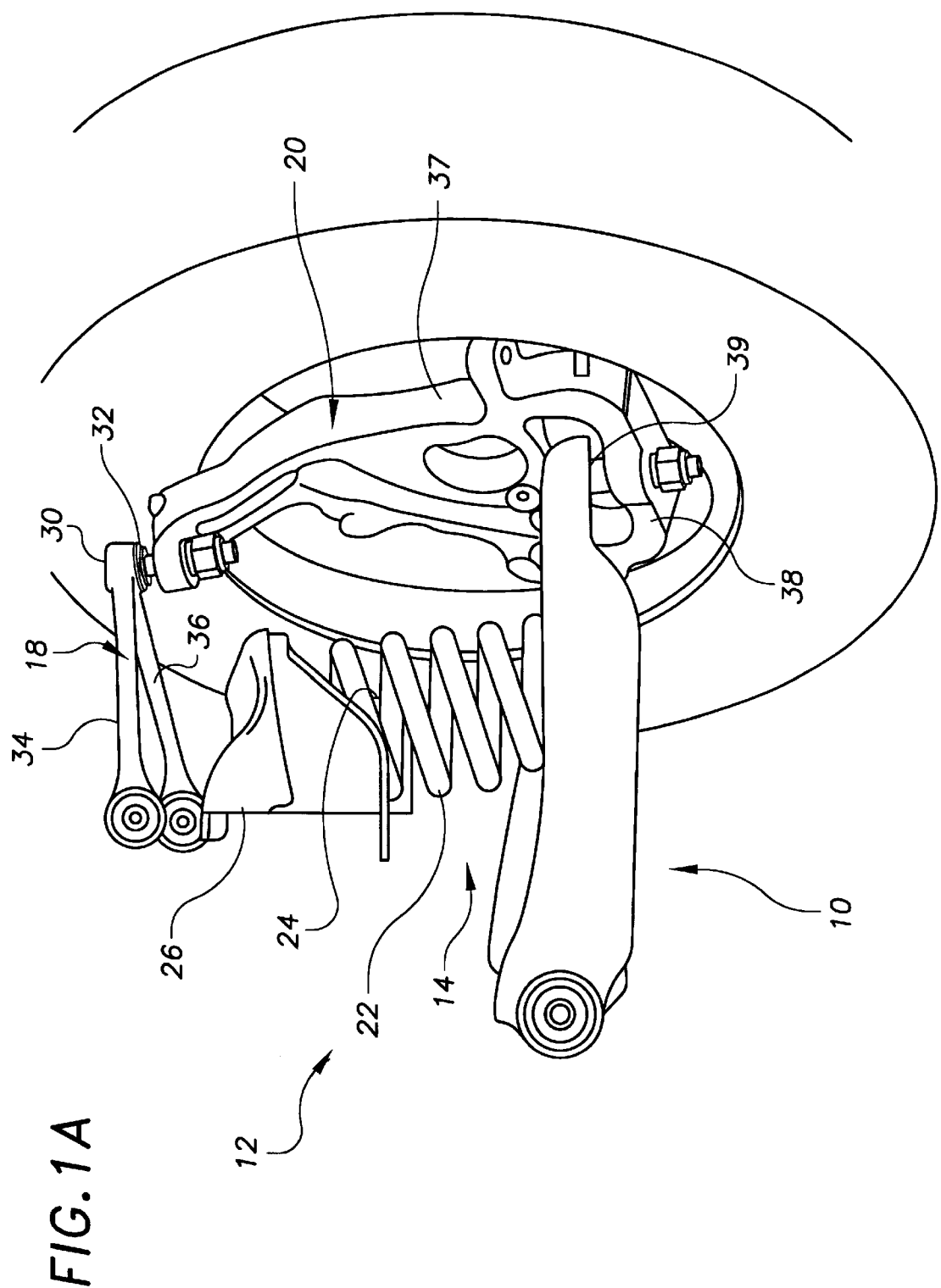
FIGS. 1A and 1B are environmental views illustrating an apparatus for coupling a ball joint to a frame of a motor vehicle constructed in accordance with the teachings of a preferred embodiment of the present invention, the apparatus shown operatively incorporated into an exemplary motor vehicle suspension.
Figure 1B:
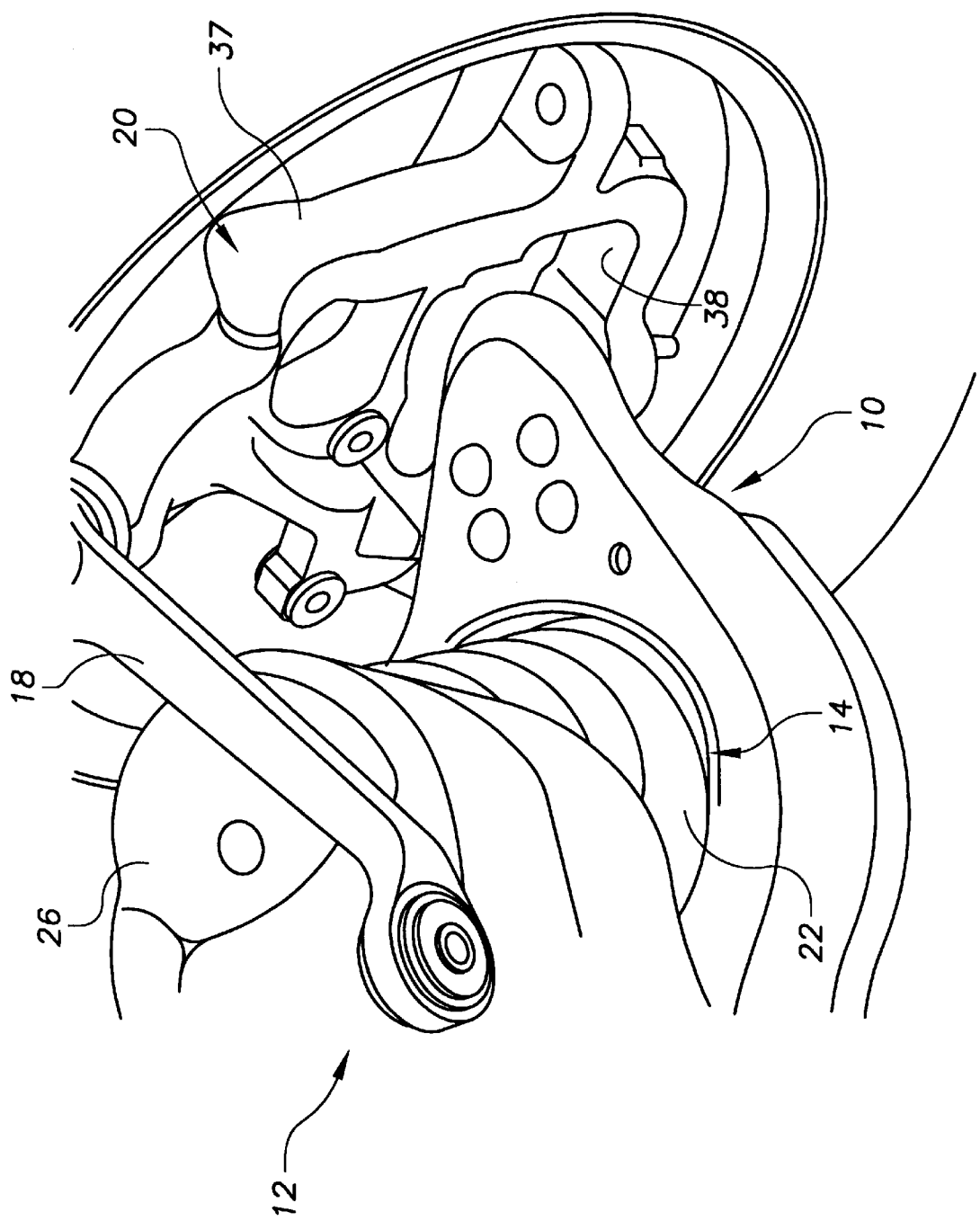

With initial reference to the environmental views of FIGS. 1A and 1B, an apparatus for coupling a ball joint to a frame of a motor vehicle is illustrated. The apparatus is identified generally at reference numeral 10. The apparatus is illustrated as a lower control arm assembly 10 shown operatively incorporated into a portion of an exemplary suspension system 12 of a motor vehicle. It will be understood that other applications for the apparatus 10 are within the scope of the present invention.

In a conventional manner, the suspension system 10 is illustrated to additionally include a suspension damper or strut 14, an upper control arm assembly 18 and a wheel carrier 20. The strut includes a spring 22 and a piston 24. A mounting member 26 is secured to an upper end of the spring 22.

The upper control arm assembly 18 has an over-all V-shape. The vertex 30 of the upper control arm assembly 18 defines an aperture (not specifically shown) for receiving a pivot such as a ball 32 carried by the wheel carrier 20. Each of a pair of legs 34 and 36 extends from the vertex 30 and is pivotally attached to the mounting member 26. The legs 34 and 36 are substantially co-planar with one another as seen in FIG. 1A.

The wheel carrier 20 includes a knuckle 37. The knuckle includes a lower surface 38. A ball and stem assembly 39 is secured to the lower surface 38.

Figure 2:
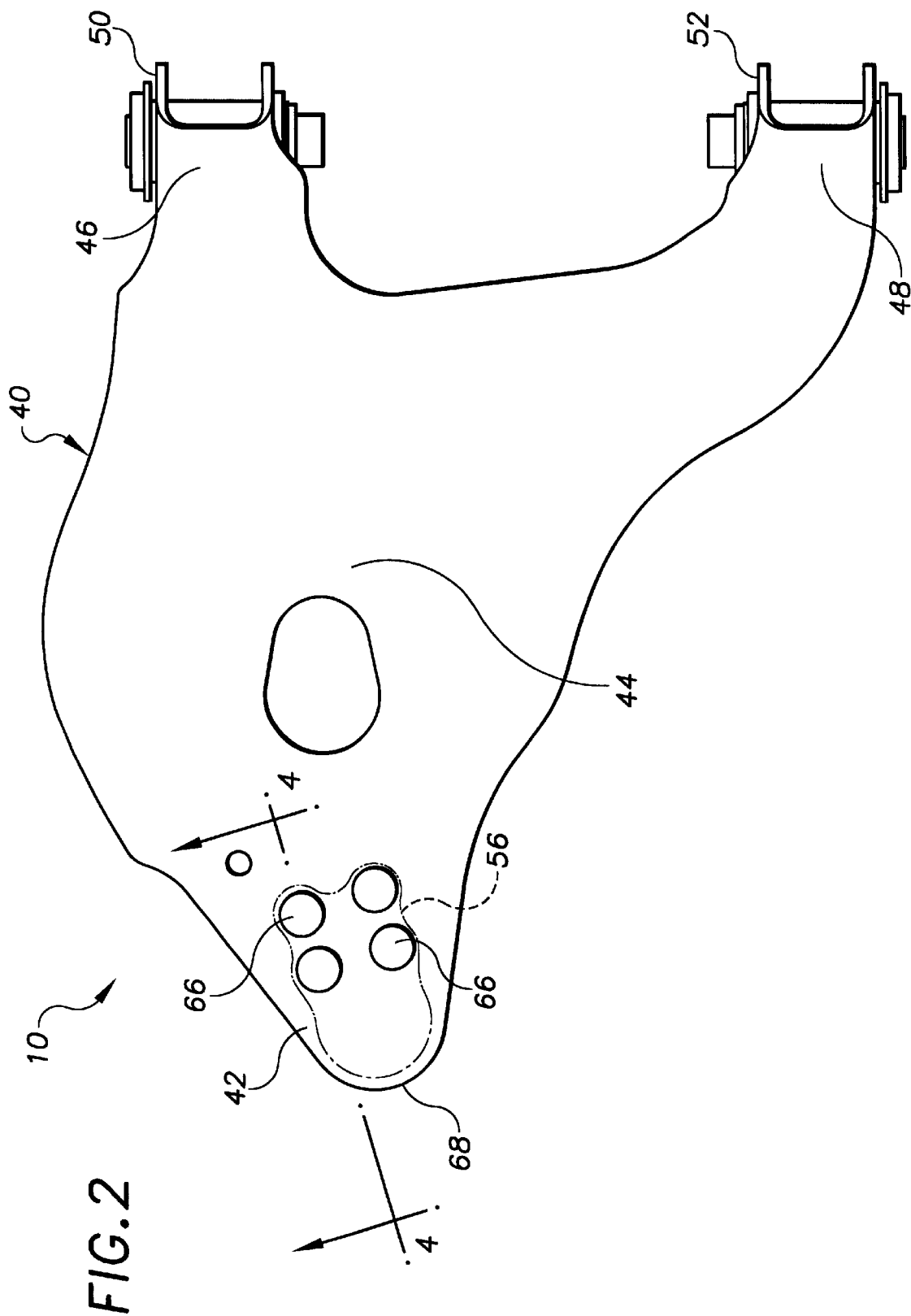
FIG. 2 is top view of the apparatus of FIG. 1.
Figure 3:
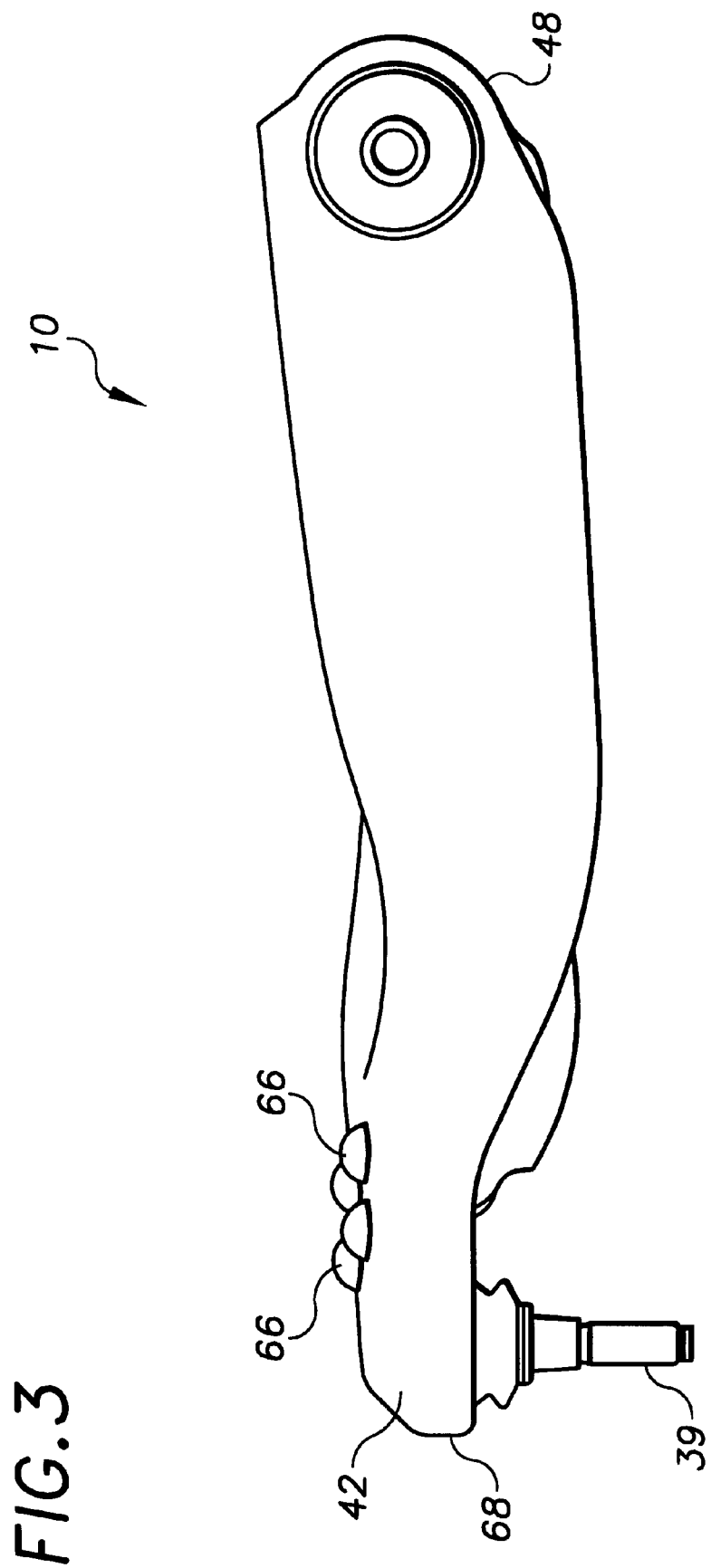
FIG. 3 is a side view of the apparatus of FIG. 1.
Figure 4:
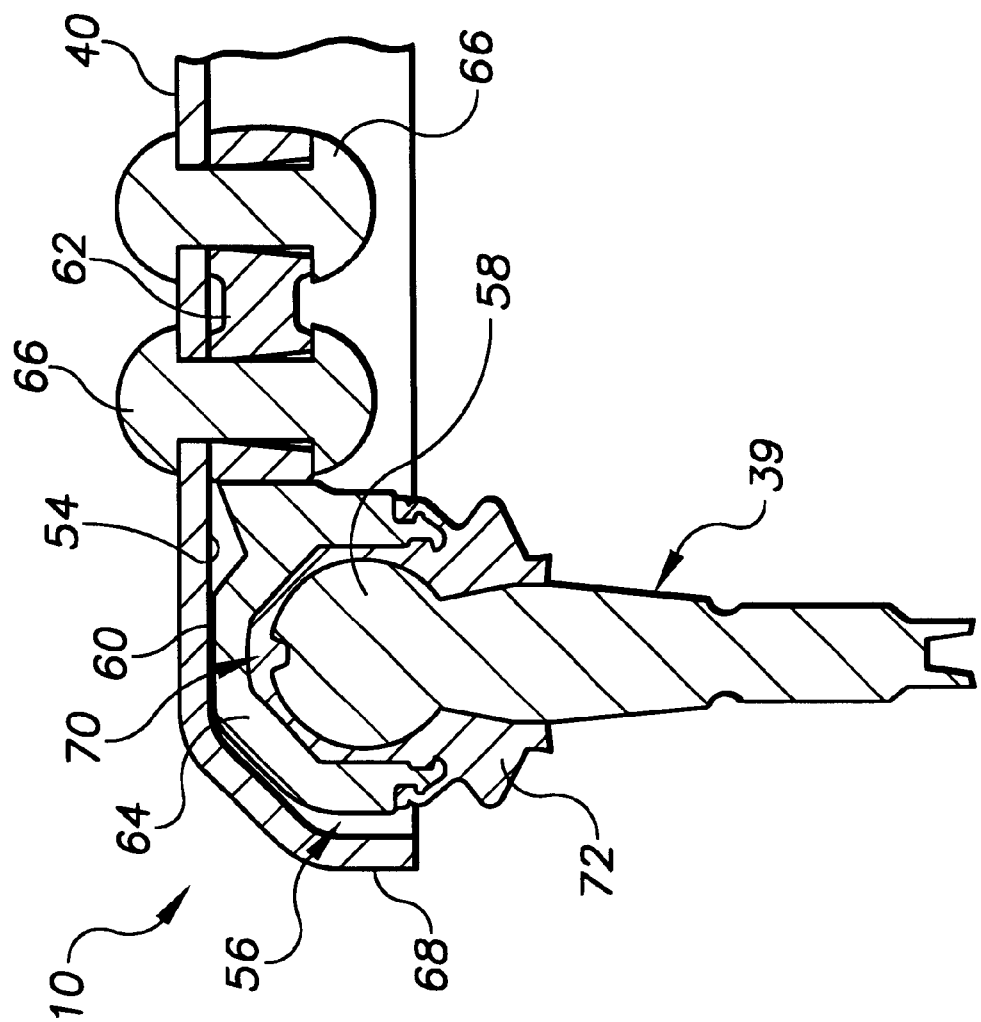
FIG. 4 is a cross-sectional view taken along the line 4—4 of FIG. 2.

With continued reference to FIGS. 1A and 1B and additional reference to FIGS. 2 through 4, the construction and operation of the lower control arm assembly 10 of the present invention will be detailed. The lower control arm assembly 10 includes a unitarily formed main body member or stamping 40. The main body member 40 is adapted to be pivotally coupled to the frame (not shown) of the motor vehicle and has a modified V-shape. The main body member 40 includes a vertex 42, a central portion 44 and a pair of legs 46 and 48. The ends 50 and 52 of the legs 46 and 48, respectively, enable the lower control arm assembly to be pivotally secured to the frame in a conventional manner. Briefly, the ends 50 and 52 carry bushings which receive pivot pins (not shown) connected to the frame. The main body portion 40 includes an underside 54 which functions in a manner to be discussed below as a support surface.

The lower control arm assembly 10 of the present invention further includes a ball joint housing 56 which cooperates with a ball 58 of the ball and stem assembly 39 to form a ball joint. The ball joint housing 56 is preferably formed of metal or other similar material. An upper surface 60 of ball joint housing defines a contact surface.

The ball joint housing 56 includes a mounting portion 62 and a ball-receiving portion 64. The mounting portion 62 is secured to the main body portion 40 with at least one fastener 66. In the embodiment illustrated, the mounting portion 62 is secured to the main body portion 40 with a plurality of rivets 66. Alternatively, it will be understood that the rivets may be replaced with other fasteners, including but not limited to threaded fasteners. The rivets 66 secure the ball joint housing 56 to the main body portion 40 at a point spaced from a nose 68 of the main body portion 40. In the embodiment illustrated a forward edge of the ball joint housing 56 is spaced from an adjacent surface of the main body member 40.

The mounting arrangement of the present invention eliminates heat affected zones and stress concentrations resulting from welded reinforcement plates which are conventionally used for rivet-on or bolt-on ball joints. As a result, weight and cost are reduced. Additionally, fatigue life is potentially improved through the elimination of welding.

The ball-receiving portion 64 of the ball joint housing 56 defines a generally cylindrical cavity 70. The generally cylindrical cavity 70 adjustably receives the ball 58. In the preferred embodiment, a race 72 is disposed between the generally cylindrical cavity 70 and the ball 58. In use, the race 72 and ball 58 are collectively received within the generally cylindrical cavity 70. A retaining member (not shown) may be used to retain the ball 58 and race 72 within the ball joint housing 56.

As shown in the cross-sectional view of FIG. 4, the such support surface 54 of the main body portion 40 is in contact with the contact surface 60 of the ball joint housing 56. The ball joint transmits vertical loads to the main body 40 of the upper control arm assembly 10 through the ball joint housing 56 directly above the spherical ball 58. However, the vertical loads are not transmitted through the fasteners 66.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. For example, while the drawings illustrate the subject invention as a lower control arm, they are also applicable for upper control arm applications. The teachings of the present invention are applicable for both driven and non-driven wheels. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. A suspension system for a vehicle having a frame and a wheel, the suspension system comprising:

a wheel carrier adapted for mounting to the wheel, the wheel carrier including a ball; and a control arm assembly including a main body portion, a ball joint housing and at least one fastener, the main body portion adapted for pivotal connection to the frame at a first end, the main body portion being formed in a stamping operation and including a recessed cavity at a second end opposite the first end, the recessed cavity including a support surface, the ball joint housing disposed within the recessed cavity and including a ball-receiving portion and a mounting portion that cooperate to form a contact surface, the ball-receiving portion including a ball cavity that is configured to receive the ball, the mounting portion being spaced apart from the ball receiving portion, the fastener fixedly coupling the mounting portion to the main body portion such that the contact surface is in a juxtaposed relation with the support surface to facilitate load transmission therebetween;

wherein the ball-receiving portion maintains the ball in a predetermined spaced relation relative to the support surface of the main body portion.

2. The suspension system of claim 1, further comprising a race disposed within an aperture defined by the ball joint housing, the race adapted to receive the ball.

3. The suspension system of claim 1, wherein the at least one fastener includes a rivet.

* * * * *